United States Patent
Lee

(10) Patent No.: US 8,351,377 B2
(45) Date of Patent: Jan. 8, 2013

(54) APPARATUS AND METHOD FOR CONTROLLING DUAL BAND DUAL MODEM

(75) Inventor: Sunghun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 293 days.

(21) Appl. No.: 12/856,090

(22) Filed: Aug. 13, 2010

(65) Prior Publication Data

US 2011/0038314 A1 Feb. 17, 2011

(30) Foreign Application Priority Data

Aug. 13, 2009 (KR) .................. 10-2009-0074621

(51) Int. Cl.
*H04B 7/03* (2006.01)
(52) U.S. Cl. ........................................ 370/328; 370/329
(58) Field of Classification Search .................. None
See application file for complete search history.

(56) References Cited

U.S. PATENT DOCUMENTS

| 2006/0291546 A1* | 12/2006 | Zitting | 375/222 |
| 2007/0060120 A1* | 3/2007 | Gerdes et al. | 455/426.1 |
| 2009/0103597 A1* | 4/2009 | Choi et al. | 375/222 |

* cited by examiner

*Primary Examiner* — David Oveissi
(74) *Attorney, Agent, or Firm* — Saliwanchik, Lloyd & Eisenschenk

(57) ABSTRACT

Disclosed is an apparatus for controlling DBDM including a first modem that performs an EVDO (Evolution-Data Optimized) or a HSDPA (High Speed Downlink Packet Access) communication, and the second modem that performs a WiMAX (Worldwide Interoperability for Microwave Access) communication, and a method for controlling DBDM, wherein one of the modems selected from the two (first and second) modems that is used for data communication of a user terminal generates a wake up signal to wake up the other modem that is not selected, and the other woken-up modem receives and analyzes communication data, and transmits a data of analysis result to the user terminal and the UART via the one modem performing the data communication.

10 Claims, 3 Drawing Sheets

APPARATUS AND METHOD FOR CONTROLLING DUAL BAND DUAL MODEM

CROSS-REFERENCE TO RELATED APPLICATION

This application claims the benefit under 35 U.S.C. §119 of Korean Patent Application No. 10-2009-0074621, filed on Aug. 13, 2009, which is hereby incorporated by reference in its entirety.

BACKGROUND

1. Field of the Invention

The present disclosure relates to an apparatus and method for controlling Dual Band Dual Modem.

2. Description of the Related Art

A DBDM (Dual Band Dual Modem) is formed with one body that includes two modems. The body is generally formed in a USB (Universal Serial Bus) dongle, and can be connected to a USB port disposed at a user terminal such as a notebook type computer.

The user terminal connected with the USB dongle type DBDM via the USB port may be wirelessly connected to a predetermined network such as Internet via one modem selected from two modems disposed at the DBDM to perform the data communication.

The two modems disposed at the USB dongle type DBDM generally includes a first modem performing EVDO (Evolution-Data Optimized) or HSDPA (High Speed Downlink Packet Access) communication, and a second modem performing WiMAX (Worldwide Interoperability for Microwave Access) communication.

The EVDO or HSDPA communication using the first modem has simultaneously an advantage and a disadvantage in that the number of nation-widely installed base stations is too many to enable performance of easy communication at any place in the nation, whereas communication charges are relatively high.

The WiMAX communication using the second modem has simultaneously an advantage and a disadvantage in that communication may be performed at a lower price over the EVDO or HSDPA communication using the first modem, whereas the number of base stations is restricted to limit places where the communication can be performed.

Therefore, terminal users determines a place as to whether the place is where EVDO or HSDPA communication using the first modem can be performed, or where WiMAX communication using the second modem can be performed, and performs data communication using one modem based on a result of the determination.

The DBDM generally includes a USB port connected to a user terminal, and a switching unit or a USB hub between the first modem performing EVDO or HSDPA communication and the second modem performing WiMAX communication, to allow the user terminal to select one of the two (first and second) modems for performance of communication.

The use of the switching unit for DBDM is to perform communication by connecting the user terminal to the first modem or the second modem through the switching unit. However, use of the switching unit has a disadvantage in that, while data communication is being performed using one modem, the other modem cannot inform the user terminal of whether a place is determined to be where data communication is possible.

For example, in a state where the switching unit is switched to the first modem to allow the user terminal to perform communication using the first modem, an operating power is supplied to the second modem to determine whether a place is where the data communication is possible.

However, the switching unit cannot inform the user terminal of whether the place is where the data communication is possible as a result of the determination, because the user terminal is connected to the first modem while the second modem is not connected to the user terminal.

Furthermore, in a state where the switching unit switches the second modem to be connected to the user terminal, the switching unit cannot inform the user terminal of whether the place is where the data communication determined by the first modem is possible.

Meanwhile, the use of USB hub is to selectively connect the first modem or the second modem to the user terminal in response to switching operation of the USB hub, and to inform the user terminal of whether the place is where the data communication respectively determined by the first modem and the second modem is possible.

However, a current supplied from the user terminal to the USB port is limited to disable to simultaneously operate the first modem and the second modem. That is, a rated current capacity capable of supplying a current from the user terminal via the USB port is limited to 500 mA.

The DBDM mounted with the USB hub an approximately 80 mA current, the first modem performing EVDO or HSDPA communication needs an approximately 450 mA current at the maximum operation, and the second modem performing WiMAX communication needs an approximately 70 mA current.

Therefore, the DBDM mounted with the USB hub may need a current capacity of approximately 600 mA for operating the USB hub, the first modem and the second modem at the same time. However, the DBDM mounted with USB hub and having a current capacity of approximately 500 mA supplied from the user terminal via the USB port cannot supply a required capacity of current from the user terminal if the first modem and the second modem are concurrently operated.

As a result, the DBDM mounted with the USB hub supplies an operating current to the first modem and the second modem by installing a separate battery, where use of separate battery is cumbersome and disadvantageous in that the size of the DBDM increases and the battery must be replaced if a charged current in the separate battery is discharged.

BRIEF SUMMARY

Accordingly, one object of the present disclosure is to address the above-noted and other disadvantages.

Another object of the present disclosure is to provide an apparatus for controlling DBDM (Dual Band Dual Modem) mounted with a first modem performing EVDO (Evolution-Data Optimized) or HSDPA (High Speed Downlink Packet Access) communication, and a second modem performing WiMAX (Worldwide Interoperability for Microwave Access) communication, and a method of the same.

Technical subjects to be solved by the present disclosure are not restricted to the above-mentioned description, and any other technical problems not mentioned so far will be clearly appreciated from the following description by the skilled in the art.

According to an apparatus and a method for controlling DBDM (Dual Band Dual Modem) of the present disclosure, an UART (Universal Asynchronous Receiver Transmitter) capable of transmitting data is interposed between a first modem and a second modem.

One of the modems selected from the two (first and second) modems is used for data communication of a user terminal, and the other that is not selected is not used for data communication of a user terminal.

The selected one modem is used for data communication of the user terminal to generate a wake-up signal and to wake up the other non-selected modem. The non-selected but woken-up modem opens an entire channel to receive data, analyze whether communication is enabled by the received data, and a data from a result of the analysis is transmitted to the selected modem via the UART. The selected modem receives the data from the result of the analysis outputted by the non-selected modem via the UART and transmits the data to the user terminal.

To achieve these and other advantages and in accordance with the purpose of the present disclosure, as embodied and broadly described herein, the present disclosure provides in one aspect an apparatus for controlling DBDM (Dual Band Dual Modem), the apparatus comprising: a USB (Universal Serial Bus) port connected to a user terminal; a first modem and a second modem each performing a wireless data communication; a switching unit selectively connecting the first or the second modem to the USB port; and a UART (Universal Asynchronous Receiver Transmitter) allowing the first and second modems to mutually transmit data, wherein one of the modems selected from the two (first and second) modems utilized for data communication of a user terminal is used for generating a wake-up signal to wake up the other modem that is not used for data communication, and the woken-up other modem receives and analyzes the data communication and transmits a data from a result of the analysis to the user terminal via the UART and the one modem performing the data communication.

In some exemplary embodiments of the present disclosure, the apparatus may further comprise a power converter configured to convert a voltage level of power inputted from the user terminal via the USB port and to supply an operating power to the first modem and the second modem.

In some exemplary embodiments of the present disclosure, the first modem may perform an EVDO (Evolution-Data Optimized) or a HSDPA (High Speed Downlink Packet Access) communication, and the second modem may perform a WiMAX (Worldwide Interoperability for Microwave Access) communication.

In some exemplary embodiments of the present disclosure, the switching unit may perform a switching operation in response to a control command from the first modem.

In another general aspect of the present disclosure, a method for controlling DBDM (Dual Band Dual Modem) is provided, the method comprising: controlling, by a switching unit, a first modem to allow the first modem to be connected to a user terminal and to determine whether an operation command has been inputted from the user terminal; performing, by the first modem, a data communication if it is determined that the operation command has been inputted from the user terminal; and generating, by a first modem, a wake-up signal to transmit to the user terminal a data of analysis result outputted by the second modem in response to the generated wake-up signal if it is determined that the operation command has not been inputted from the user terminal.

In some exemplary embodiments of the present disclosure, the method may comprise controlling, by the first modem, the switching unit to allow the second modem to be connected to the user terminal if it is determined that the operation command has been inputted from the user terminal.

In some exemplary embodiments of the present disclosure, the method may comprise, subsequent to the second modem being connected to the user terminal: receiving, by the first modem, communication data via an entire channel if a wake-up signal is inputted from the second modem; and transmitting, by the first modem having received the data of analysis result obtained by analyzing the received communication data from the first modem, the data of analysis result to the user terminal.

In some exemplary embodiments of the present disclosure, the method may comprise: determining whether the second modem is connected to the user terminal; performing the data communication in response to a communication command inputted from the user terminal if it is determined that the second modem is connected to the user terminal; and generating, by a second modem, a wake-up signal to transmit to the first modem and transmitting to the user terminal a data of analysis result outputted by the first modem in response to the generated wake-up signal if it is determined that the communication command has not been inputted from the user terminal.

In some exemplary embodiments of the present disclosure, the method may comprise, if it is determined that the second modem is not connected to the user terminal: receiving, by the second modem, the communication data via an entire channel in response to the wake-up signal generated by the first modem; and transmitting, by the first modem having received the data of analysis result obtained by analyzing the received communication data from the second modem, the data of analysis result to the user terminal.

In some exemplary embodiments of the present disclosure, the first modem may perform an EVDO (Evolution-Data Optimized) or a HSDPA (High Speed Downlink Packet Access) communication, and the second modem may perform a WiMAX (Worldwide Interoperability for Microwave Access) communication.

In some exemplary embodiments of the present disclosure, the transmission of the data of analysis result between the first modem and the second modem may be performed by a UART (Universal Asynchronous Receiver Transmitter).

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, exemplary embodiments of the present disclosure are described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
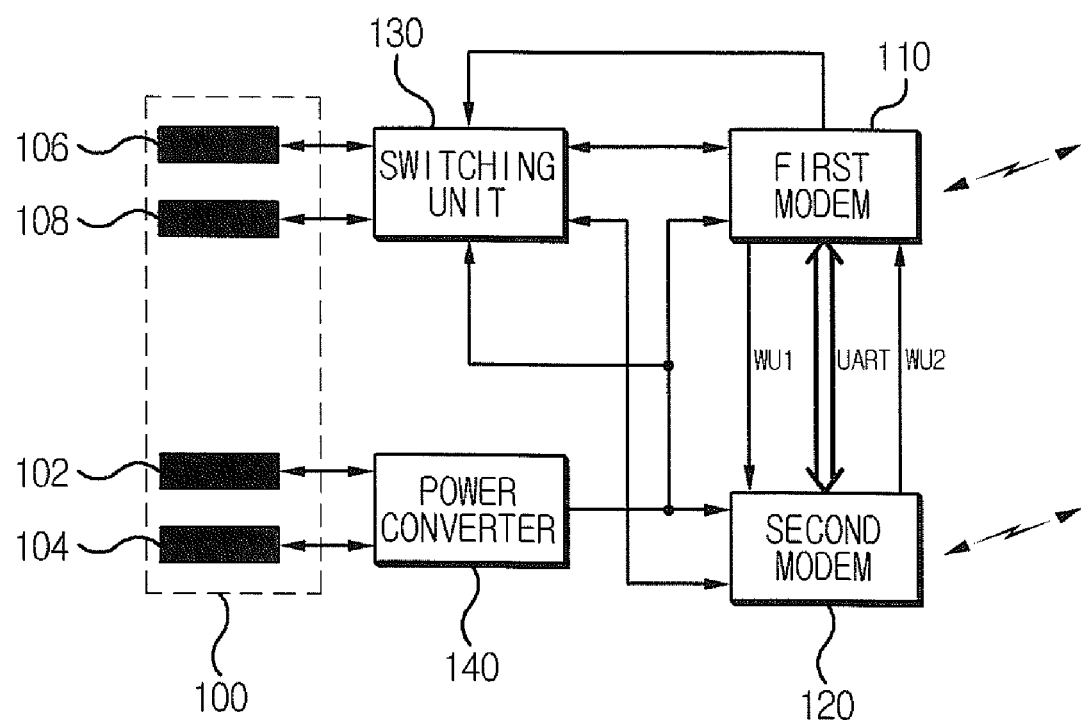
FIG. 1 is a block diagram illustrating a configuration of a DBDM in an apparatus for controlling the DBDM according to an exemplary embodiment of the present disclosure.

FIG. 1 is a block diagram illustrating a configuration of a DBDM in an apparatus for controlling the DBDM according to an exemplary embodiment of the present disclosure, where reference numeral 100 is a USB port. The USB port 100 is mounted at a USB port (not shown) disposed at a user terminal for electrical connection.

The USB port may include two power input terminals 102, 104 and two communication terminals 106, 108. The two power input terminals 102, 104 may receive a power of approximate 500 mA supplied from the user terminal. The two communication terminals 106, 108 may be used for data transmission between the user terminal and the two communication terminals 106, 108.

Reference numeral 110 is a first modem and reference numeral 120 is a second modem. The first modem 110 may perform, for example, an EVDO (Evolution-Data Optimized) or a HSDPA (High Speed Downlink Packet Access) communication, and the second modem may perform, for example, a WiMAX (Worldwide Interoperability for Microwave Access) communication.

The first modem 110 and the second modem 120 may transmit wake-up signals (WU1, WU2) to each other to analyze whether it is possible to perform data communication at the current positions, and output a data of analysis result.

The first modem 110 and the second modem 120 may be interconnected via UART (Universal Asynchronous Receiver Transmitter) and transmit to each other the data of analysis result of whether it is possible to perform data communication at the current positions via the UART (Universal Asynchronous Receiver Transmitter).

Reference numeral 130 is a switching unit. The switching unit 130 may be switched in response to a control signal outputted by the first modem 120 to selectively connect the two communication terminals 106, 108 formed at the USB port 100 to the first modem 110 or the second modem 120.

Reference numeral 140 is a power converter. The power switcher 140 may convert the power supplied through the two power input terminals 102, 104 formed at the USB port 100 and supply an operating power to the first modem 110, the second modem 120 and the switching unit 130.

The DBDM thus configured according to the present disclosure is operated in such a manner that in a case the USB port 100 is connected to a USB port formed at the user terminal, a power having a predetermined voltage level may be inputted from the user terminal through the power input terminals 102, 104 of the USB port 100.

The inputted power may be converted in voltage level by the power converter 140, and the converted power may be supplied to the first modem 110, the second modem 120 and the switching unit 130 as an operating power to allow normally operating.

For example, the power converter 140 may convert 5 volts to 3 volts in the power inputted through the two power input terminals 102, 104 of the USB port 100, where the converted voltage is supplied as an operating power to the first modem 110, the second modem 120 and the switching unit 130.

Under this circumstance, the first modem 110 may control the switching unit 130 to allow the two communication terminals 106, 108 formed at the USB port 100 to be connected to the first modem 110 via the switching unit 130. Furthermore, the first modem 110 may determine whether a communication command has been inputted from the user terminal and perform the data communication in response to an operation command inputted from the user terminal, if it is determined that the communication command has been inputted.

Still furthermore, the first modem 110 may periodically generate the wake-up signal (WU1), where the generated wake-up signal (WU1) is inputted to the second modem 120. The second modem 120 may be woken up in response to the generated wake-up signal (WU1) to determine whether a present position is where the data communication is possible. That is, the second modem 120 may receive WiMAX data transmitted by a base station to an entire channel, analyze the received WiMAX data, and transmit a data of an analysis result to the first modem 110 via the UART.

Successively, the first modem 110 may transmit the data of analysis result of whether to perform the data communication by the second modem 120 to the user terminal via the two communication terminals 106, 108 formed at the USB port 100, so that the user can determine whether it is possible to perform the data communication using the second modem 120.

Thereafter, in a case an operation command to change to the second modem is inputted from the user terminal, the first modem 110 may control the switching unit 130 to allow the two communication terminals 106, 108 formed at the USB port 100 to be connected to the second modem 120 via the switching unit 130.

Under this circumstance, the second modem 120 may determine whether the communication command has been inputted from the user terminal, and perform the data communication in response to the operation command inputted from the user terminal, if it is determined that the communication command has been inputted from the user terminal.

Furthermore, the second modem 120 may periodically generate the wake-up signal (WU2), where the generated wake-up signal (WU2) is inputted to the first modem 110. The first modem 110 may receive the EVDO or HSDPA data via the entire channel, analyze the EVDO or HSDPA data, and transmit a data of analysis result to the second modem 120 via the UART.

Then, the second modem 120 may transmit the data of analysis result analyzed by the first modem 110 to the user terminal, where the user may determine whether it is possible to perform the data communication using the first modem 110.

In the present disclosure, a maximum current capacity needed by the first modem 110 is approximately 450 mA, in a case the first modem 110 is connected to the user terminal via the switching unit 130 and the communication terminals 106, 108 to perform the data communication.

In a case the second modem 120 is woken up in response to the wake-up signal (WU1) to receive the WiMAX data, analyzes the received WiMAX data and transmits a data of analysis data to the user terminal via the first modem 110, a needed current capacity is approximately 30 mA, because the second modem 120 does not transmit the data.

A current capacity that is needed for performing the switching operation by the switching unit 130 is approximately 5 mA.

Therefore, the needed current capacity for operating the first modem 110, the second modem 120 and the switching unit 130 is approximately 485 mA at the maximum, such that the first modem 110, the second modem 120 and the switching unit 130 can be normally operated, because a rated current capacity supplied to the user terminal via the USB port 100 is 500 mA.

Still furthermore, even if the second modem 120 performs the data communication, and the first modem 110 receives and analyzes the EVDO or HSDPA data and transmits the data of analysis result to the user terminal, a required current capacity is lower than 500 mA that is supplied to the USB port 100 from the user terminal, such that the first modem 110, the second modem 120 and the switching unit 130 can be normally operated.

Figure 2:
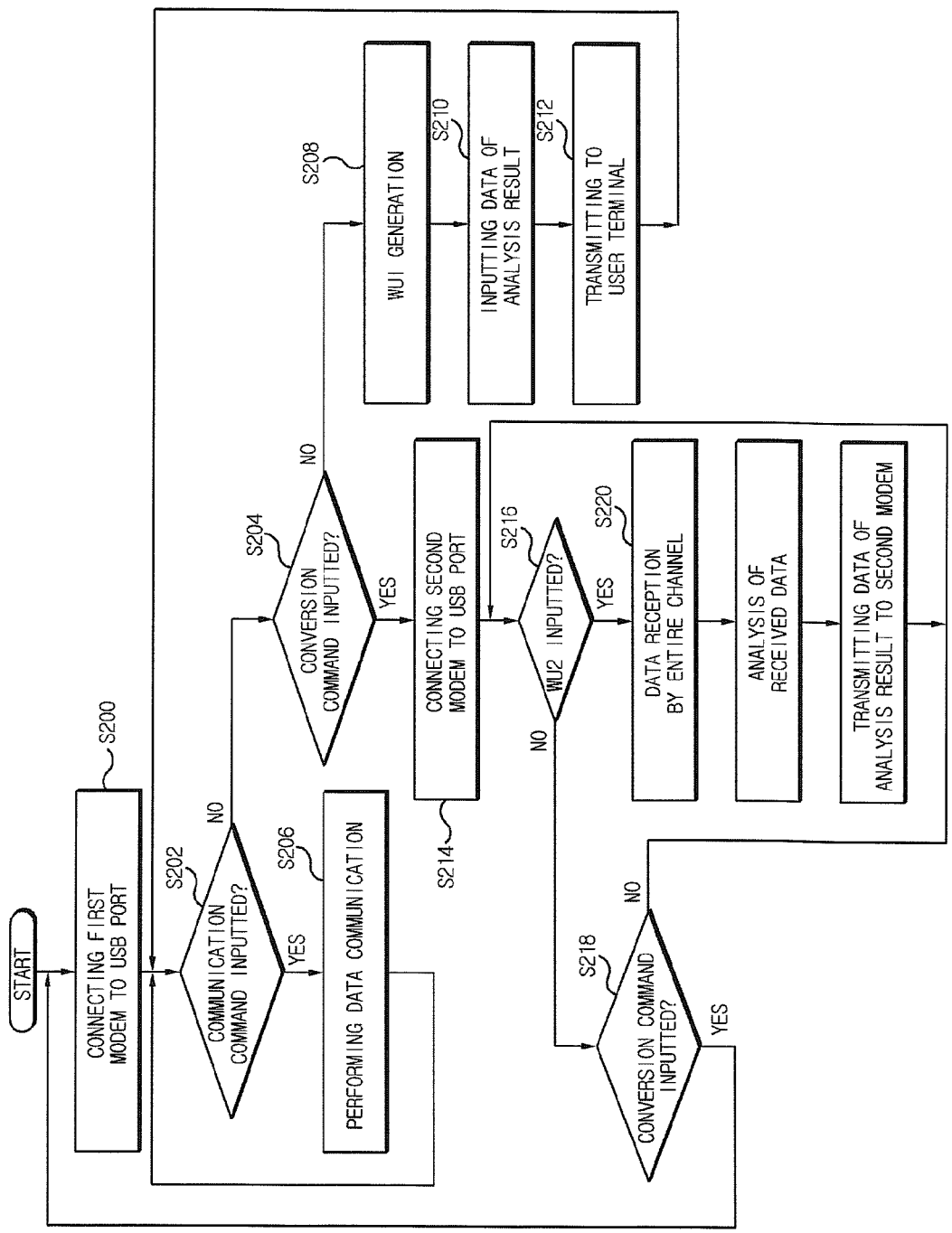
FIG. 2 is a signal flowchart illustrating an operation of a first modem according to a method for controlling a DBDM according to an exemplary embodiment of the present disclosure.

Meanwhile, FIG. 2 is a signal flowchart illustrating an operation of a first modem according to a method for controlling a DBDM according to an exemplary embodiment of the present disclosure.

Referring to FIG. 2, the first modem 110 may first control the switching unit 130, in a case an operating power is supplied, to allow the first modem 110 to be connected to the communication terminals 106, 108 of the USB port 100 (S200), whereby communication is performed with the user terminal.

Under this circumstance, the first modem 110 may determine whether a communication command to perform data communication or a conversion command to connect the second modem 120 to the communication terminals 106, 108 of the USB port 100 has been inputted from the user terminal (S202, S204).

As a result of the determination at steps (S202, S204), if it is determined that the communication command has been inputted, the first modem 110 may wirelessly perform the data communication in response to the communication command inputted from the user terminal (S206).

As a result of the determination at steps (S202, S204), if it is determined that all the communication command and the conversion command have not been inputted, the first modem 110 may generate the wake-up signal (WU1) (S208), where the wake-up signal (WU1) is inputted to the second modem 120.

Successively, the second modem 120 may receive data transmitted by the base station using the entire channel in response to the wake-up signal (WU1), analyze the received data, and output the data of analysis result to the first modem 110. The first modem 110 that has received the data of analysis result (S210) may transmit the data to the user terminal (S212).

As a result of the determination at steps (S202, S204), if it is determined that all the conversion command has been inputted, the first modem 110 may control the switching unit 130 to allow the second modem 120 to be connected to the switching unit 130 (S214), whereby the second modem 120 can perform the communication with the user terminal.

Under this circumstance, the first modem 110 may determine whether the wake-up signal (WU2) or the conversion command has been inputted from the second modem 120 via the UART (S216, S218).

As a result of the determination at steps (S216, S218), if it is determined that the wake-up signal (WU2) has been inputted, the first modem 110 may open all the channels to receive data transmitted by the base station (S220) and to analyze the received data (S222).

In a case the analysis of the data is completed, the first modem 110 may transmit the data of analysis result to the second modem 120 via the UART (S224), where the transmitted data of analysis result is sent to the user terminal by the second modem 120.

As a result of the determination at steps (S216, S218), if it is determined that the conversion command has been inputted from the second modem 120 via the UART, the first modem 110 may return to the step (S200) to allow the first modem 110 to be connected to the USB port 100, and perform a predetermined operation in response to the operation command inputted from the user terminal, as noted in the foregoing.

Figure 3:
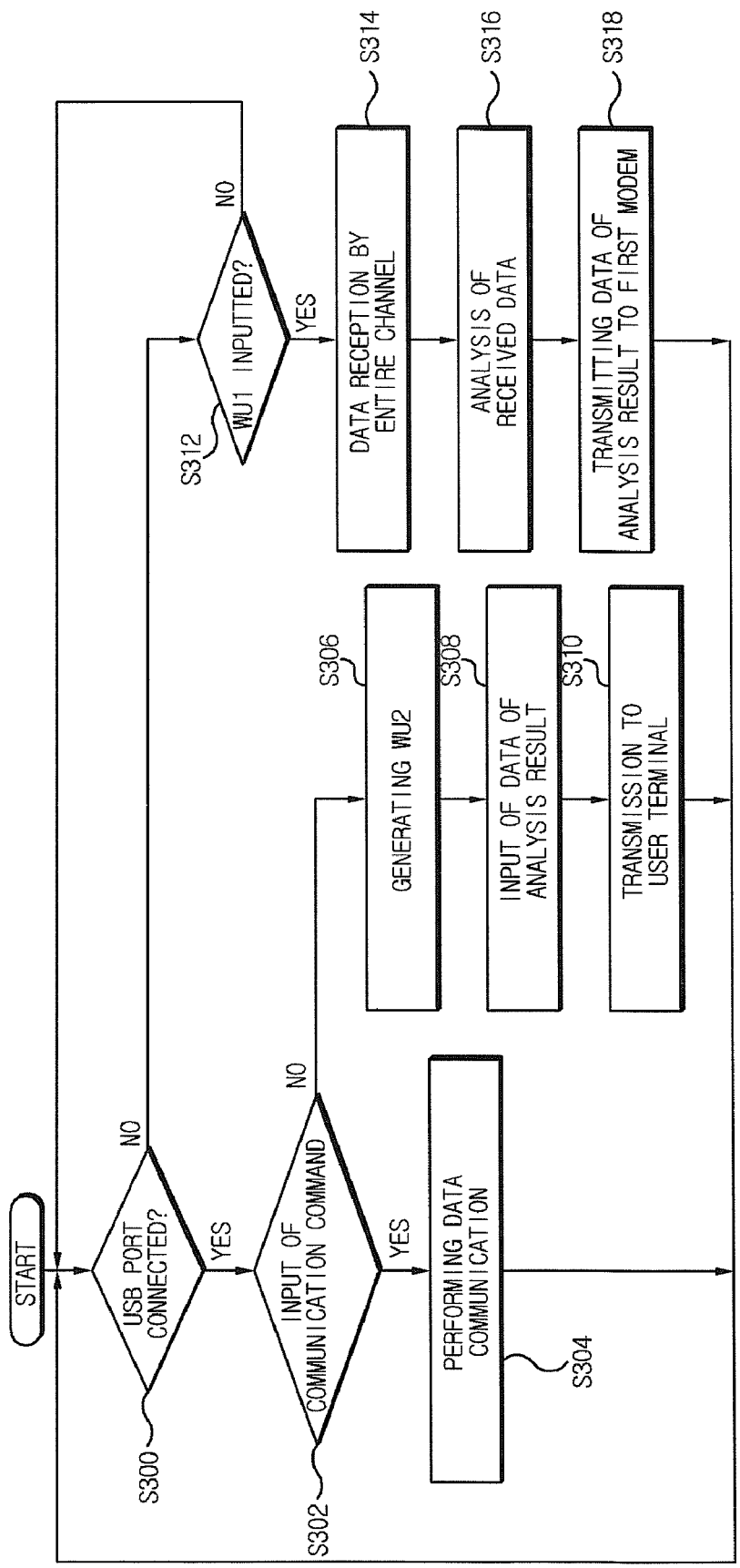
FIG. 3 is a signal flowchart illustrating an operation of a second modem according to a method for controlling a DBDM according to an exemplary embodiment of the present disclosure.

FIG. 3 is a signal flowchart illustrating an operation of a second modem according to a method for controlling a DBDM according to an exemplary embodiment of the present disclosure.

Referring to FIG. 3, the second modem 120 may determine whether the second modem 120 is connected to the USB port 100 (S300).

As a result of the determination, if it is determined that the second modem 120 is connected to the USB port 100, the second modem 120 may determine whether a communication command has been inputted from the user terminal (S302).

As a result of the determination, if it is determined that the communication command has been inputted from the user terminal, the second modem 120 may wirelessly perform data communication in response to the communication command (S304).

As a result of the determination, if it is determined that the communication command has not been inputted from the user terminal, the second modem 120 may generate the wake-up signal (WU2) (S306), where the generated wake-up signal (WU2) is inputted to the first modem 110.

Then, the first modem 110 may receive the data transmitted by the base station in response to the wake-up signal (WU1) using the entire channel, as mentioned in steps (S220, S222, S224 of FIG. 2), analyze the received data and output the data of analysis result, where the second modem 120 may receive the data of analysis result outputted by the first modem 110 (S308) and send the received data of analysis result to the user terminal (S310).

As a result of the determination, if it is determined that the second modem 120 is not connected to the USB port 100, the second modem 120 may determine whether the wake-up signal (WU1) has been inputted from the first modem 110 (S312).

As a result of the determination, if it is determined that the wake-up signal (WU1) has been inputted from the first modem 110, the second modem 120 may retrieve all the channels to receive data transmitted by the base station (S314) and analyze the received data (S316).

If the analysis of the received data is completed, the second modem 120 may transmit the data of analysis result to the first modem 110 via the UART (S318), where the data of analysis result is transmitted to the user terminal by the first modem 110.

The above-mentioned apparatus and method for controlling DBDM (Dual Band Dual Modem) according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. An apparatus for controlling DBDM (Dual Band Dual Modem), the apparatus comprising:
    a USB (Universal Serial Bus) port connected to a user terminal;
    a first modem and a second modem each performing a wireless data communication;
    a switching unit selectively connecting the first or the second modem to the USB port;
    a power converter configured to convert a voltage level of power inputted from the user terminal via the USB port and to supply an operating power to the first modem and the second modem; and
    a UART (Universal Asynchronous Receiver Transmitter) allowing the first and second modems to mutually transmit data,
    wherein one of the modems selected from the two (first and second) modems utilized for data communication of a user terminal is used for generating a wake-up signal to wake up the other modem that is not used for data communication, and the woken-up other modem receives and analyzes the data communication and transmits a data from a result of the analysis to the user terminal via the UART and the one modem performing the data communication.

2. An apparatus for controlling DBDM (Dual Band Dual Modem), the apparatus comprising:
    a USB (Universal Serial Bus) port connected to a user terminal:
    a first modem and a second modem each performing a wireless data communication;
    a switching unit selectively connecting the first or the second modem to the USB port; and
    a UART (Universal Asynchronous Receiver Transmitter) allowing the first and second modems to mutually transmit data,
    wherein one of the modems selected from the two (first and second) modems utilized, for data communication of a user terminal is used for generating a wake-up signal to wake up the other modem that is not used for data communication, and the woken-up other modem receives and analyzes the data communication and transmits a data from a result of the analysis to the user terminal via the UART and the one modem performing the data communication, and
    wherein the first modem performs an EVDO (Evolution-Data Optimized) or a HSDPA (High Speed Downlink Packet Access) communication, and the second modem performs a WiMAX (Worldwide Interoperability for Microwave Access) communication.

3. The apparatus of claim 2, wherein the switching unit performs a switching operation in response to a control command from the first modem.

4. A method for controlling DBDM (Dual Band Dual Modem), the method comprising:
    controlling, by a switching unit, a first modem to allow the first modem to be connected to a user terminal and to determine whether an operation command has been inputted from the user terminal;
    performing, by the first modem, a data communication if it is determined that the operation command has been inputted from the user terminal; and
    generating, by a first modem, a wake-up signal to transmit to the second modem and transmitting to the user terminal a data of analysis result outputted by the second modem in response to the generated wake-up signal if it is determined that the communication command has not been inputted from the user terminal.

5. The method of claim 4, comprising controlling, by the first modem, the switching unit to allow the second modem to be connected to the user terminal if it is determined that the operation command has been inputted from the user terminal.

6. The method of claim 5, comprising:
    subsequent to the second modem being connected to the user terminal, receiving, by the first modem, communication data via an entire channel if a wake-up signal is inputted from the second modem; and
    transmitting, by the second modem having received the data of analysis result obtained by analyzing the received communication data from the first modem, the data of analysis result to the user terminal.

7. The method of claim 4, comprising:
    determining whether the second modem is connected to the user terminal;
    performing the data communication in response to a communication command inputted from the user terminal if it is determined that the second modem is connected to the user terminal; and
    generating, by a second modem, a wake-up signal to transmit to the first modem and transmitting to the user terminal a data of analysis result outputted by the first modem in response to the generated wake-up signal if it is determined that the communication command has not been inputted from the user terminal.

8. The method of claim 7, comprising, if it is determined that the second modem is not connected to the user terminal:
    receiving, by the second modem, the communication data via an entire channel in response to the wake-up signal generated by the first modem; and
    transmitting, by the first modem having received the data of analysis result obtained by analyzing the received communication data from the second modem, the data of analysis result to the user terminal.

9. The method of claim 4, wherein the first modem performs an EVDO (Evolution-Data Optimized) or a HSDPA (High Speed Downlink Packet Access) communication, and the second modem may perform a WiMAX (Worldwide Interoperability for Microwave Access) communication.

10. The method of claim 4, wherein transmission of data of analysis result between the first modem and the second modem is performed by a UART (Universal Asynchronous Receiver Transmitter).

* * * * *